US010152945B2

(12) United States Patent
Takahashi et al.

(10) Patent No.: US 10,152,945 B2
(45) Date of Patent: Dec. 11, 2018

(54) IMAGE PROCESSING APPARATUS CAPABLE OF PERFORMING CONVERSION ON INPUT IMAGE DATA FOR WIDE DYNAMIC RANGE

(71) Applicant: CANON KABUSHIKI KAISHA, Tokyo (JP)

(72) Inventors: Ryosuke Takahashi, Sagamihara (JP); Yasuo Suzuki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 448 days.

(21) Appl. No.: 14/621,960

(22) Filed: Feb. 13, 2015

(65) Prior Publication Data
US 2015/0235618 A1    Aug. 20, 2015

(30) Foreign Application Priority Data
Feb. 14, 2014    (JP) .................................. 2014-026676

(51) Int. Cl.
G09G 5/06       (2006.01)
G06T 5/00       (2006.01)
(Continued)

(52) U.S. Cl.
CPC .............. G09G 5/06 (2013.01); G06T 5/009 (2013.01); G09G 5/02 (2013.01); G11B 27/031 (2013.01);
(Continued)

(58) Field of Classification Search
CPC . G09G 5/06; G09G 5/02; G06T 5/009; H04N 9/68
(Continued)

(56) References Cited

U.S. PATENT DOCUMENTS

| 6,522,778 | B1 * | 2/2003 | Tamagawa ........... H04N 1/6033 345/601 |
| 2001/0015774 | A1 * | 8/2001 | Endo ....................... H04N 9/73 348/807 |
| 2006/0098255 | A1 * | 5/2006 | Hyodo ................... G06T 5/009 358/521 |

(Continued)

FOREIGN PATENT DOCUMENTS

| JP | H10-013613 A | 1/1998 |
| JP | 2004-038693 A | 2/2004 |

(Continued)

*Primary Examiner* — Barry Drennan
*Assistant Examiner* — Terrell Robinson
(74) *Attorney, Agent, or Firm* — Canon U.S.A., Inc. IP Division

(57) ABSTRACT

There is provided an image processing apparatus capable of appropriately performing conversion processing using a lookup table on image data in an image format with a wide dynamic range. In the image processing apparatus, a system control unit sets a second dynamic range (display range) as a display target in a first dynamic range (input range) corresponding to an image format of input image data. A 1D-LUT data generation unit generates, based on the set second dynamic range (display range), first lookup table (LUT) data as a lookup table for performing first conversion processing on the input image data. A 3D-LUT data generation unit generates, based on the first dynamic range (display range), second lookup table (LUT) data as a lookup table for performing second conversion processing on image data obtained by the first conversion processing.

21 Claims, 12 Drawing Sheets

(51) Int. Cl.
*G11B 27/031* (2006.01)
*H04N 9/68* (2006.01)
*G09G 5/02* (2006.01)

(52) U.S. Cl.
CPC ..... *H04N 9/68* (2013.01); *G06T 2207/10016* (2013.01); *G06T 2207/10024* (2013.01); *G06T 2207/20208* (2013.01); *G09G 2320/0271* (2013.01); *G09G 2320/0606* (2013.01); *G09G 2320/0666* (2013.01); *G09G 2320/0673* (2013.01); *G09G 2320/08* (2013.01); *G09G 2340/06* (2013.01)

(58) Field of Classification Search
USPC .......................................................... 345/601
See application file for complete search history.

(56) References Cited

U.S. PATENT DOCUMENTS

| | | | | |
|---|---|---|---|---|
| 2007/0058183 | A1* | 3/2007 | Osaki | H04N 9/67 358/1.9 |
| 2014/0111505 | A1* | 4/2014 | Hayashi | G09G 3/20 345/214 |
| 2016/0044210 | A1* | 2/2016 | Imafuku | H04N 1/6019 382/164 |

FOREIGN PATENT DOCUMENTS

| | | |
|---|---|---|
| JP | 2005-319214 A | 11/2005 |
| JP | 2006-135684 A | 5/2006 |
| JP | 2007-096797 A | 4/2007 |
| JP | 2011-223568 A | 11/2011 |

\* cited by examiner

IMAGE PROCESSING APPARATUS CAPABLE OF PERFORMING CONVERSION ON INPUT IMAGE DATA FOR WIDE DYNAMIC RANGE

BACKGROUND OF THE INVENTION

Field of the Invention

The present inventions relate to at least one of an image processing apparatus, a data generation apparatus, an image processing method, and a data generation method capable of inputting image data in an image format with a wide dynamic range.

Description of the Related Art

Recently, imaging apparatuses capable of capturing an image with a wide dynamic range have been developed, and imaging apparatuses capable of outputting image data with log characteristics have been available. For example, Cineon-Log, created from characteristics of a film with a wide dynamic range, ACES-Log, corresponding to Academy Color Encoding Specification (ACES), and the like have been used in the motion picture industry.

On the other hand, display apparatuses are required to be capable of processing image data of various characteristics input from various imaging apparatuses. Some display apparatuses use a lookup table (LUT) to perform gradation conversion processing, color conversion processing, and the like on an image signal input from an imaging apparatus. Such display apparatuses can have a smaller implemented circuit size with a smaller number of grid points in the LUT. Thus, a grid point is not set for each possible gradation value of input image data. Instead, the number of grid points is set to be less than the possible number of gradation values of the image data. There is a method in which a LUT is generated in advance by calculating an output value obtained by conversion processing on the input value of image data for each grid point and output values corresponding to the input values of the image data between the grid points are calculated by interpolation. Generally, with a larger number of grid points, higher conversion accuracy is achieved, but a larger circuit size leads to a cost increase, especially in a three-dimensional LUT (3D-LUT). When the number of grid points is the same on all the three axes in the 3D-LUT, the total number of grid points is the third power of the number of grid points on a single axis.

Japanese Patent Application Laid-Open No. 2007-096797 discusses a technique of performing one-dimensional LUT (1D-LUT) conversion processing and 3D-LUT conversion processing in this order on data of each of red (R), green (G), and blue (B) colors. More specifically, the 1D-LUT conversion processing is performed on extracted common components of the conversion coefficients in the 3D-LUT conversion processing. Then, the 3D-LUT conversion processing is performed on coefficient components excluding the 1D-LUT conversion components that are common among data of each of R, G, and B colors.

Unfortunately, the method discussed in Japanese Patent Application Laid-Open No. 2007-096797 involves a large interpolation error when the LUT conversion processing is performed on image data with a wide dynamic range. More specifically, when the LUT conversion processing is performed on image data with a large dynamic range by using a LUT with the number of grid points that is the same as that of a LUT used when it is performed on image data with a narrow dynamic range, the interpolation in the LUT conversion processing results in a large error due to a large range between the adjacent grid points of the LUT.

SUMMARY OF THE INVENTION

The present inventions are directed to at least one of an image processing apparatus, a data generation apparatus, an image processing method, and a data generation method capable of favorably performing conversion processing using a LUT on image data in an image format with a wide dynamic range.

According to an aspect of the present invention, an image processing apparatus includes a setting unit configured to set a second dynamic range as a display target in a first dynamic range corresponding to an image format of input image data, a first generation unit configured to generate, based on the set second dynamic range, a first lookup table (LUT) as a lookup table for performing first conversion processing on the input image data, a first conversion processing unit configured to perform the first conversion processing on the input image data by using the generated first LUT, a second generation unit configured to generate, based on the first dynamic range, a second LUT as a lookup table for performing second conversion processing on image data obtained by the first conversion processing, and a second conversion processing unit configured to perform the second conversion processing, by using the second LUT, on the image data obtained by the first conversion processing.

According to another aspect of the present invention, a data generation apparatus includes a setting unit configured to set a second dynamic range as a display target in a first dynamic range corresponding to an image format of input image data, a first generation unit configured to generate, based on the set second dynamic range, a first lookup table (LUT) as a lookup table for performing first conversion processing on the input image data, and a second generation unit configured to generate, based on the first dynamic range, a second LUT as a lookup table for performing second conversion processing on image data obtained by the first conversion processing.

According to yet another aspect of the present invention, an image processing method includes setting a second dynamic range as a display target in a first dynamic range corresponding to an image format of input image data, generating, based on the set second dynamic range, a first lookup table (LUT) as a lookup table for performing first conversion processing on the input image data, performing the first conversion processing on the input image data by using the generated first LUT, generating, based on the first dynamic range, a second LUT as a lookup table for performing second conversion processing on image data obtained by the first conversion processing, and performing the second conversion processing, by using the second LUT, on the image data obtained by the first conversion processing.

According to yet another aspect of the present invention, a data generation method includes setting a second dynamic range as a display target in a first dynamic range corresponding to an image format of input image data, generating, based on the set second dynamic range, a first lookup table (LUT) as a lookup table for performing first conversion processing on the input image data, and generating, based on the first dynamic range, a second LUT as a lookup table for performing second conversion processing on image data obtained by the first conversion processing.

According to yet another aspect of the present invention, an image processing apparatus includes a setting unit configured to set a second dynamic range as a display target in a first dynamic range corresponding to an image format of input image data, a generation unit configured to generate, based on a ratio of the set second dynamic range to the first dynamic range corresponding to the image format of the input image data, a lookup table for performing conversion processing on the input image data, and a conversion processing unit configured to perform the conversion processing on the input image data by using the generated lookup table.

According to yet another aspect of the present invention, an image processing method includes setting a second dynamic range as a display target in a first dynamic range corresponding to an image format of input image data, generating, based on a ratio of the set second dynamic range to the first dynamic range corresponding to the image format of the input image data, a lookup table for performing conversion processing on the input image data, and performing the conversion processing on the input image data by using the generated lookup table.

According to other aspects of the present inventions, other apparatuses and methods are discussed herein. Further features of the present inventions will become apparent from the following description of exemplary embodiments with reference to the attached drawings.

DESCRIPTION OF THE EMBODIMENTS

Exemplary embodiments of the present inventions will be described below with reference to the drawings. The technical scope of the present inventions is defined by the scope of claims, and is not limited to the exemplary embodiments described below. Not all the combinations between features described in the exemplary embodiments are essential for the present inventions. What is described in the specification and the drawings are merely an example, and thus do not limit the present inventions. Various modifications (including organic combinations of the exemplary embodiments) may be made based on the gist of the present inventions, and thus are not excluded from the scope of the present inventions. Thus, the present inventions include any configuration obtained by combining the exemplary embodiments and the modification examples thereof.

Figure 1:
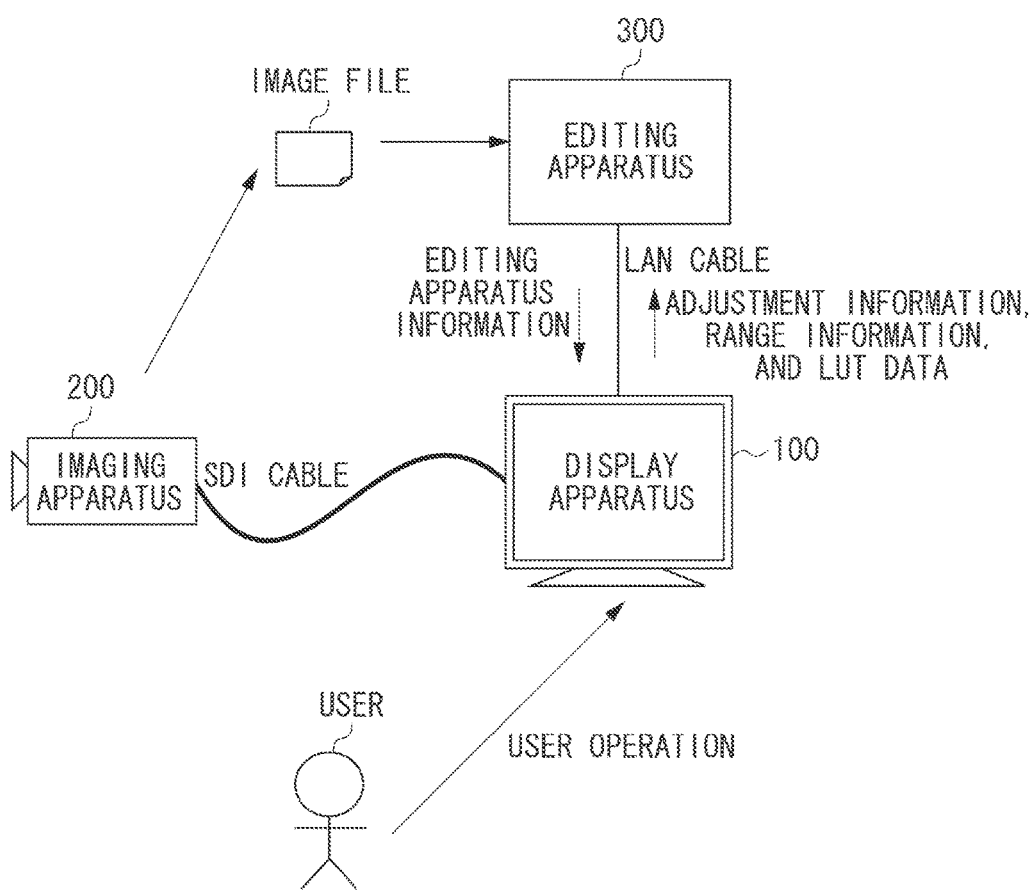
FIG. 1 is a diagram illustrating a configuration example of a system using a display apparatus according to an exemplary embodiment of the present inventions.

FIG. 1 is a diagram illustrating a configuration example of a system using a display apparatus 100 according to the present exemplary embodiment. The system includes the display apparatus 100, an imaging apparatus 200 connected to the display apparatus 100 via a serial digital interface (SDI) cable, and an editing apparatus 300 connected to the display apparatus 100 via a local area network (LAN) cable. Alternatively, these apparatuses may be connected to each other via cables other than the SDI and LAN cables.

The imaging apparatus 200 transmits uncompressed digital image data and uncompressed digital audio data to the display apparatus 100 through the SDI cable. A user checks an image captured by the imaging apparatus 200 on a screen of the display apparatus 100. The user performs color adjustment on the displayed image by operating a user interface (such as an operation panel) of the display apparatus 100. The display apparatus 100 transmits color adjustment information, related to the color adjustment, to the editing apparatus 300 through the LAN cable.

An image file obtained through imaging by the imaging apparatus 200 is stored in an external or built-in recording medium. The editing apparatus 300 acquires the image file stored in the recording medium, and performs various types editing on the image. The editing apparatus 300 acquires the color adjustment information from the display apparatus 100, and thus can perform color adjustment processing similar to the color adjustment with the display apparatus 100. The editing apparatus 300 can acquire range information and lookup table (LUT) data from the display apparatus 100 and use them for the editing processing on the image.

The display apparatus 100 receives editing apparatus information such as information indicating a format of the LUT data and the like supported by the editing apparatus 300 and information indicating an image format supported by the editing apparatus 300.

Figure 2:
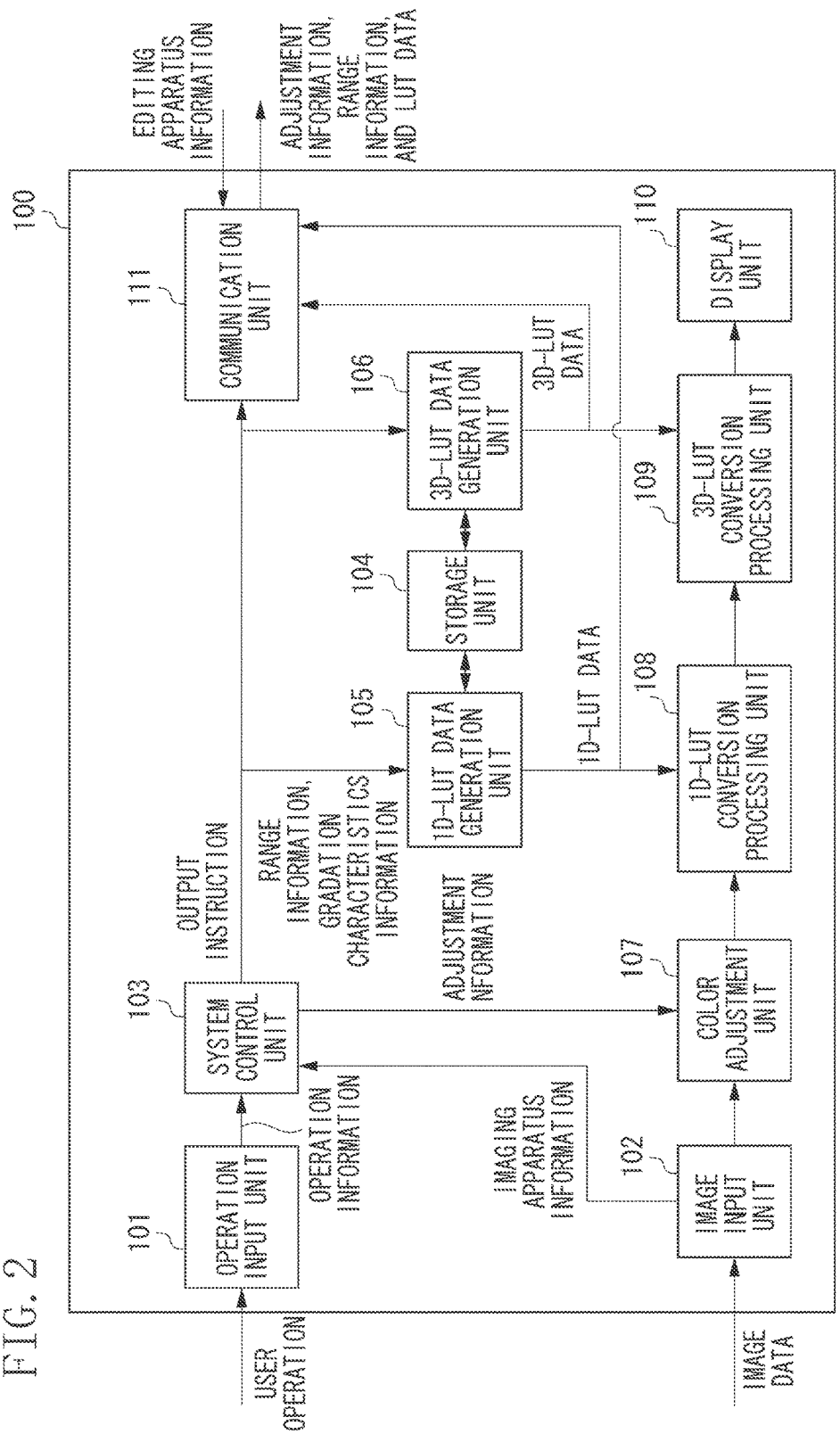
FIG. 2 is a block diagram illustrating a configuration example of the display apparatus illustrated in FIG. 1.

FIG. 2 is a block diagram illustrating a configuration example of the display apparatus 100 illustrated in FIG. 1. The display apparatus 100 includes an operation input unit 101, a system control unit 103, an image input unit 102, a storage unit 104, a 1D-LUT data generation unit 105, and a 3D-LUT data generation unit 106. The display apparatus 100 further includes a color adjustment unit 107, a 1D-LUT conversion processing unit 108, a 3D-LUT conversion processing unit 109, a display unit 110, and a communication unit 111. A one-dimensional lookup-table and a three-dimensional lookup table are hereinafter referred to as a 1D-LUT and a 3D-LUT, respectively.

The operation input unit 101 includes user interfaces such as various switches and dials provided to the display apparatus 100 and a processing circuit for the user interfaces. The operation input unit 101 receives an operation from the user, and outputs an instruction from the user as operation information to the system control unit 103 at the subsequent processing stage.

The image input unit 102 includes a terminal for a SDI communication standard and a processing circuit for the terminal. The image input unit 102 inputs image data, which is transmitted from an external apparatus such as the imaging apparatus 200 through the SDI cable, into the display apparatus 100. The image input unit 102 performs bit conversion processing and format conversion processing on the input image data, and outputs the data obtained by the conversion processing to the color adjustment unit 107. For example, in response to input of 12-bit image data, the bit conversion processing is performed to convert the input 12-bit image data into 10-bit image data. For example, in response to input of image data in a YCbCr format, the format conversion processing is performed to convert the input image data in the YCbCr format into image data in an RGB format. Further, the image input unit 102 acquires imaging apparatus information added to the input image data, and outputs the information to the system control unit 103.

When the user operates an operation panel of the imaging apparatus 200 to set an effective dynamic range (hereinafter, also referred to as an effective range) to be actually used in the image data that is to be output from the imaging apparatus 200, effective range information indicating the effective range is added to the image data as the imaging apparatus information. For example, in the range from 0 to 20000% specified in ACESproxy, the range from 0 to 800% may be set as the effective range. Here, the range is calculated by using, as the reference value 100%, the level of light that is reflected from a light-reflecting whiteboard and is received by the imaging apparatus 200 when the imaging apparatus 200 has captured an image of the whiteboard. For simplifying the description, in the present exemplary embodiment, the possible dynamic range of image data is assumed to be specified as 0 to 20000% in ACESproxy. However, it is actually specified in more detail in ACESproxy.

The system control unit 103 includes a central processing unit (CPU), for example and controls the operation of each functional block of the display apparatus 100. More specifically, the system control unit 103 reads out and executes a program in a memory (not illustrated) such as a random access memory (ROM) to control the operation of each functional block of the display apparatus 100.

More specifically, the system control unit 103 acquires operation information from the operation input unit 101. The operation information is related to a user operation for setting an image format of image data input from an external apparatus such as the imaging apparatus 200, and to a user operation for setting a color adjustment value for the image data. According to the acquired operation information, the system control unit 103 sets the image format of the input image data, and further sets a dynamic range (hereinafter, also referred to as an input range) corresponding to the image format, and gradation characteristics related to log characteristics and the like. The dynamic range (input range) corresponding to an image format of input image data represents the maximum dynamic range defined in the image format, that is, the maximum usable dynamic range in the image format. The system control unit 103 outputs the input range information related to the image data and the gradation characteristics information to the 1D-LUT data generation unit 105, the 3D-LUT data generation unit 106, and the communication unit 111. The system control unit 103 sets the color adjustment value for the input image data according to the acquired operation information, and outputs adjustment information related to the set color adjustment value to the color adjustment unit 107.

The system control unit 103 acquires imaging apparatus information from the image input unit 102. Based on effective range information included in the acquired imaging apparatus information, the system control unit 103 sets a dynamic range (hereinafter, also referred to as a display range) as a display target of the display apparatus 110. Here, the effective range is directly set as the display range, and thus the display range is a dynamic range corresponding to the effective range. The system control unit 103 outputs the set display range information to the 1D-LUT data generation unit 105, the 3D-LUT data generation unit 106, and the communication unit 111. The system control unit 103 also acquires, from the operation input unit 101, operation information including an output instruction from the user for outputting various pieces of information and data to the editing apparatus 300. Then, the system control unit 103 controls an operation of the communication unit 111 according to the acquired operation information so that the communication unit 111 outputs the adjustment information, the input range information, the display range information, the 1D-LUT data, the 3D-LUT data, and the like to an external apparatus such as the editing apparatus 300.

Here, for example, when ACESproxy is set as the image format of image data input from the external apparatus such as the imaging apparatus 200, the input range corresponding to the image format is 0 to 20000% as specified in ACESproxy. The range 0 to 20000% represents the possible dynamic range of the image data in the ACESproxy image format. When DT709 is set as the image format of the input image data, the input range corresponding to the image format is 0 to 100%, for example. As described above, the user arbitrarily sets the image format of the input image data, so that an arbitrary input range is set.

Figure 3:
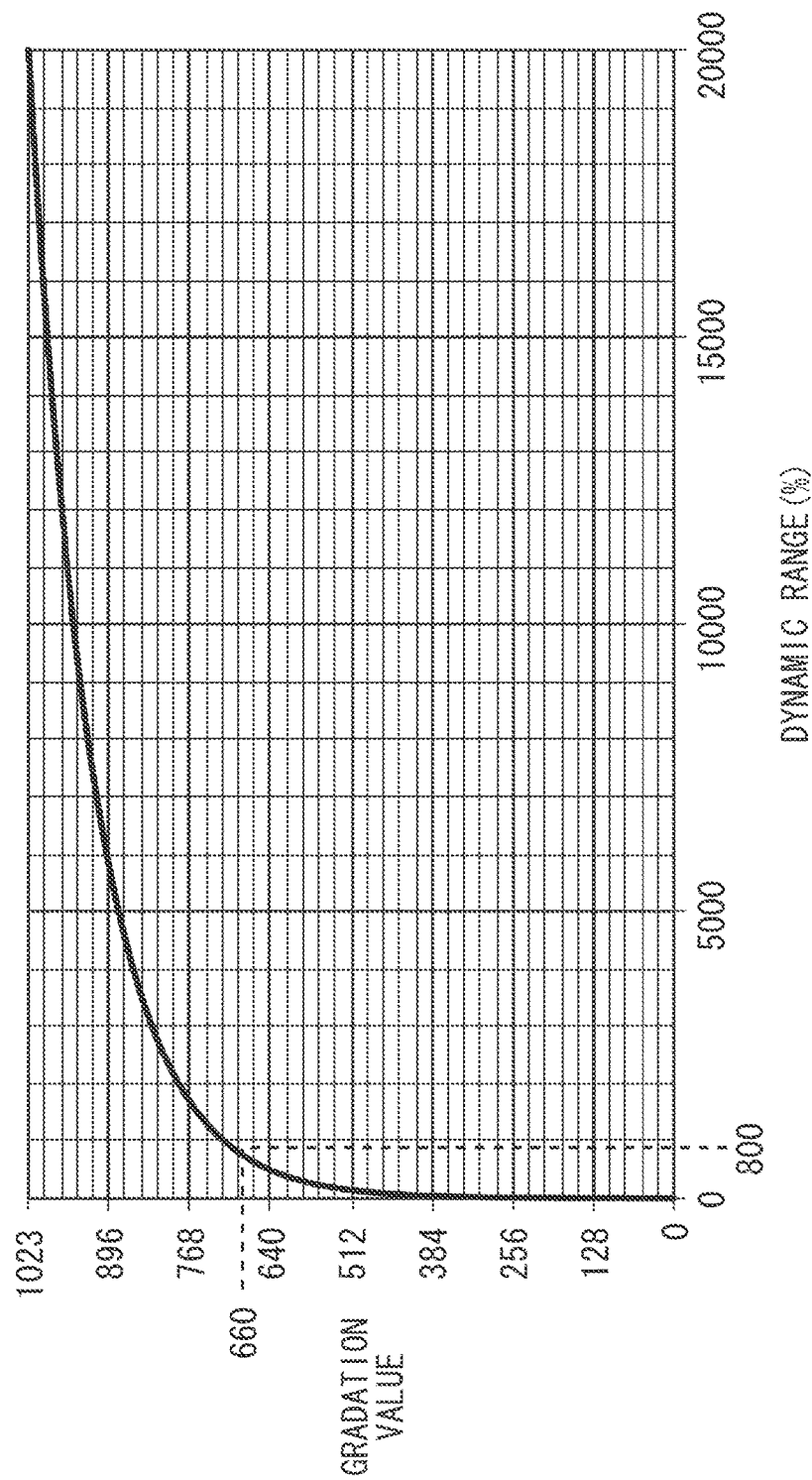
FIG. 3 is a diagram illustrating a corresponding relationship between gradation values of each of red (R), green (G), and blue (B) colors of image data, and input and effective ranges.

FIG. 3 is a diagram illustrating a corresponding relationship between the gradation values of each of R, G, and B colors of image data and the input and effective ranges. In FIG. 3, the horizontal axis and the vertical axis represent the dynamic range and the gradation values, respectively. More specifically, FIG. 3 illustrates an example in which the image data that is output to the color adjustment unit 107 from the image input unit 102 has log characteristics and a 10-bit gradation (gradation values ranging from 0 to 1023) of each of R, G, and B colors, and the input range and the effective range are 0 to 20000% and to 800%, respectively. Here, a large number of gradations are allocated within the effective range 0 to 800% of the image data. In the present exemplary embodiment, the system control unit 103 sets the effective range 0 to 800% of the image data as the display range which is the display target of the display unit 110.

As has been described, in the present exemplary embodiment, the system control unit 103 sets the input range and the color adjustment value according to the user operation. However, this should not be construed in a limiting sense. For example, when the image data input to the display apparatus 100 includes the input range information, the system control unit 103 may acquire the input range information from the input image data. The system control unit 103 may also acquire adjustment information indicating the color adjustment value set in an external apparatus, by reading a file or through communications.

Further, as has been described, in the present exemplary embodiment, the system control unit 103 acquires the effective range information that is added to the image data input to the image input unit 102. However, this should not be construed as a limiting sense. For example, the system control unit 103 may analyze the image data input to the image input unit 102, and determine the range in which the image data is concentrated as the effective range.

The color adjustment unit 107 performs luminance/color adjustment processing on the image data from the image input unit 102 according to the adjustment information from the system control unit 103, and outputs the adjusted image data to the 1D-LUT conversion processing unit 108 at the subsequent processing stage. In the present exemplary embodiment, a description is made assuming that the color adjustment unit 107 performs color adjustment processing using the slope, offset, and power defined by American Society of Cinematographers (ASC)-Color Decision List (CDL). However, the color adjustment processing is not limited to that defined by ASC-CDL. For example, the color adjustment processing may be performed by multiplying each pixel value by an adjustment gain value.

The ASC-CDL color adjustment processing is represented by the following equation (1):

$$\text{Pixel value after color adjustment} = (\text{pixel value before color adjustment} \times \text{slope} + \text{offset})^{power} \quad (1)$$

Here, the slope is adjusted for each of the R, G, and B colors, whereby the "slope" of the input-output characteristics can be adjusted while maintaining the black level. Further, the offset is adjusted for each of the R, G, and B colors, whereby the luminance can be adjusted while maintaining the "slope" of the input-output characteristics. Furthermore, the power is adjusted for each of the R, G, and B colors, whereby the intermediate gradation characteristics can be adjusted while maintaining the black and white levels of the input-output characteristics.

The storage unit 104 is a non-volatile memory, for example and stores 1D-LUT generation data and 3D-LUT generation data required for generating 1D-LUT data and 3D-LUT data, respectively.

The 1D-LUT data generation unit 105 acquires the input range information, the display range information, and the gradation characteristics information from the system control unit 103. The 1D-LUT data generation unit 105 further acquires, as the ID-LUT generation data, the following equation (2) used for the ID-LUT conversion processing and a value of the coefficient $\gamma$ used in the equation (2) from the storage unit 104.

$$\text{Pixel value after conversion} = (\text{pixel value before conversion})^{\gamma} \quad (2)$$

The storage unit 104 stores in advance a plurality of values $\gamma$ corresponding to different ratios of the display range to the input range. The 1D-LUT data generation unit 105 calculates the ratio of the display range to the input range based on the acquired input range information and display range information, and acquires the value $\gamma$ corresponding to the calculation result from the storage unit 104. For example, when the input range is 0 to 20000% and the display range is 0 to 800%, the ratio of the display range to the input range is 0.04. For example, a case is considered where the ratio of the display range to the input range is 0.03 and the corresponding value $\gamma$ is 0.041, and the ratio of the display range to the input range is 0.05 and the corresponding value $\gamma$ is 0.045. In this case, the 1D-LUT data generation unit 105 acquires two parameters 0.041 and 0.045 as the value $\gamma$ corresponding to a 0.04 ratio of the display range to the input range from the storage unit 104. Then, the 1D-LUT data generation unit 105 calculates the average value of the two parameters to obtain 0.043 as the value $\gamma$ to be used. As described above, when the storage unit 104 does not store the value $\gamma$ corresponding to a certain ratio of the display range to the input range, the 1D-LUT data generation unit 105 acquires two parameters corresponding to the ratios closer to the certain ratio, and calculates the average of the two parameters to obtain the value $\gamma$ to be used.

Figure 4:
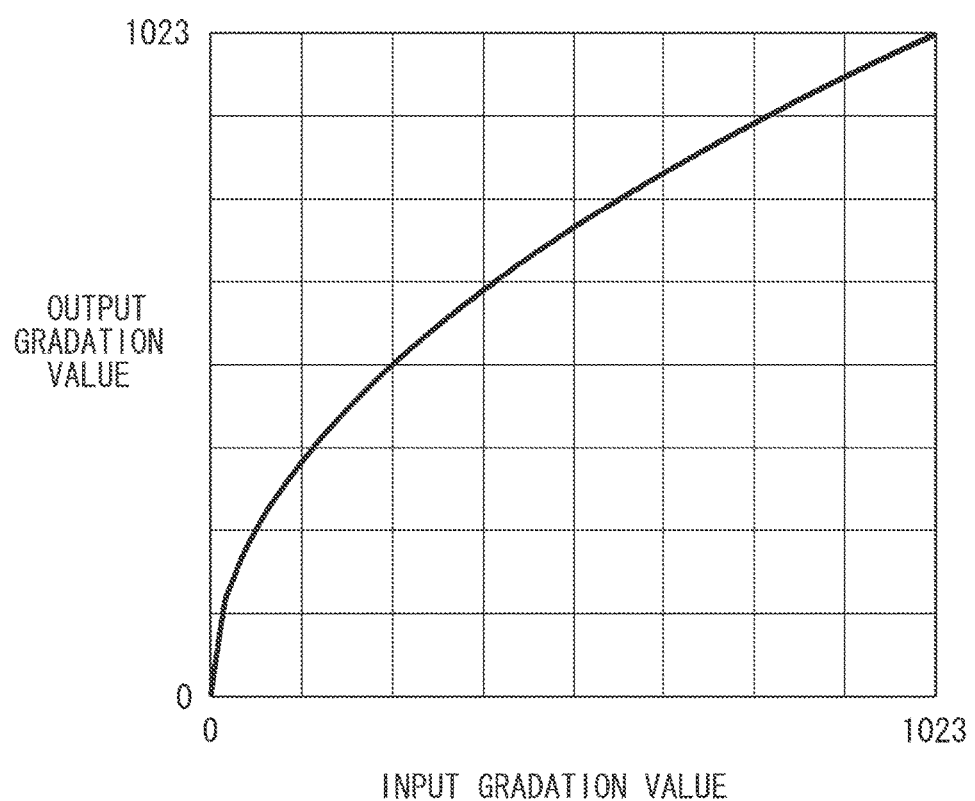
FIG. 4 is a diagram illustrating one-dimensional lookup table (1D-LUT) data generated by using an equation (2).

FIG. 4 is a diagram illustrating the 1D-LUT data generated by the 1D-LUT data generation unit 105 with the equation (2). In FIG. 4, the horizontal axis and the vertical axis represent input gradation values and output gradation values, respectively. The 1D-LUT data is conversion data (data including input gradation values and output gradation values) corresponding to 1024 grid points for each of the R, G, and B colors. In the present exemplary embodiment, a smaller value $\gamma$ is used for a smaller ratio of the display range to the input range, and thus a larger value $\gamma$ (value $\gamma$ closer to 1) is used for a larger ratio of the display range to the input range. Since a smaller value $\gamma$ is used for a smaller ratio of the display range to the input range, low gradation characteristics are improved (a larger number of output gradation values are allocated in a low gradation range of the input gradation values).

The 1D-LUT data generation unit 105 normalizes the pixel values obtained by the conversion so as to be represented by 10-bit gradation values to generate the 1D-LUT data, and transmits the generated 1D-LUT data to the 1D-LUT conversion processing unit 108 and the communication unit 111.

The 1D-LUT conversion processing unit 108 acquires the 1D-LUT data generated by the 1D-LUT data generation unit 105. The 1D-LUT conversion processing unit 108 uses conversion data (data including input gradation values and output gradation values) stored in the 1024 grid points of the ID-LUT to perform the 1D-LUT conversion processing on each pixel value of the image data output from the color adjustment unit 107. The 1D-LUT conversion processing unit 108 outputs the image data obtained by the 1D-LUT conversion processing to the 3D-LUT conversion processing unit 109.

Figure 5:
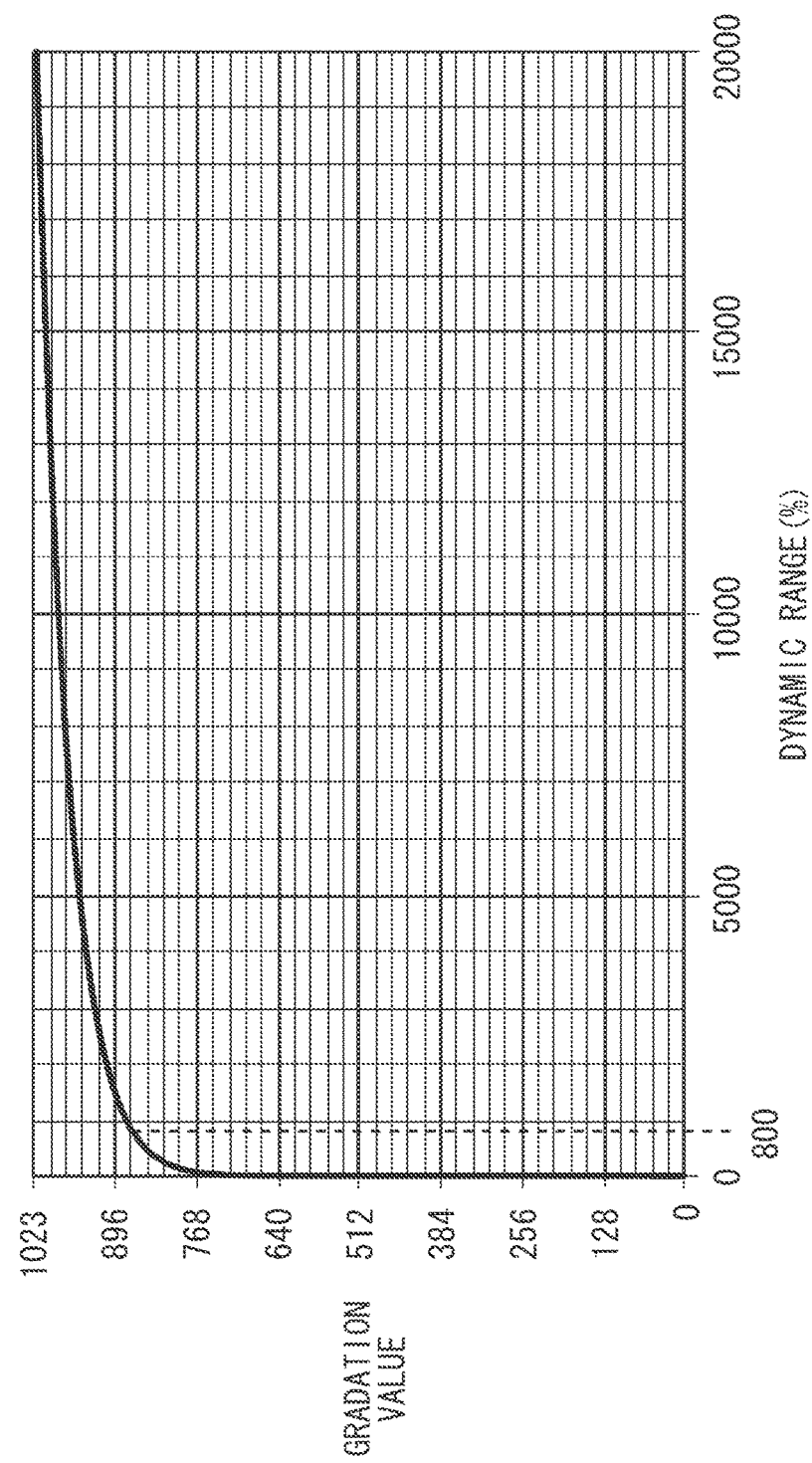
FIG. 5 is a diagram illustrating a corresponding relationship between gradation values of each of R, G, and B colors of image data obtained by 1D-LUT conversion processing using the 1D-LUT data illustrated in FIG. 4, and input and display ranges.

FIG. 5 is a diagram illustrating a corresponding relationship between the gradation values of each of the R, G, and B colors of the image data obtained by the 1D-LUT conversion processing by using the 1D-LUT data illustrated in FIG. 4, and the input and display ranges. In FIG. 5, the horizontal axis and the vertical axis represent the dynamic range and the gradation values, respectively. FIG. 5 illustrates an example where the image data obtained by the 1D-LUT conversion processing includes a 10-bit gradation (gradation values from 0 to 1023) of each of the R, G, and B colors and the input range and the display range are 0 to 20000% and 0 to 800%, respectively. Compared with FIG. 3 illustrating a state before the 1D-LUT conversion processing, in FIG. 5, a larger number of gradations are allocated in the display range 0 to 800% of the image data.

For example, the following equation (3) may be used instead of the equation (2) shown as an example of the equation used in the 1D-LUT conversion processing:

$$\text{Pixel value after conversion} = \log_{\alpha}\{1+(\alpha^{\beta}-1\times(\text{pixel value before conversion})\} + \beta \quad (3)$$

When the equation (3) is used, the storage unit 104 stores in advance a plurality of values α and β corresponding to different ratios of the display range to the input range. The 1D-LUT data generation unit 105 may calculate the ratio of the display range to the input range based on the acquired input range information and display range information, and may acquire the values α and β corresponding to the calculation result from the storage unit 104. For example, the values α and β corresponding to a 0.03 ratio of the display range to the input range are 8 and 6, respectively, and the values α and β corresponding to a 0.05 ratio of the display range to the input range are 4 and 6, respectively. Also in this case, with a lower ratio of the display range to the input range, the low gradation characteristics are improved (a larger number of output gradation values are allocated in a low gradation range of the input gradation values).

The following equation (4) may also be used as the equation used in the 1D-LUT conversion processing:

Pixel value after conversion=pixel value before conversion×G     (4)

When the equation (4) is used, the storage unit 104 stores in advance a plurality of gain values G corresponding to different ratios of the display range to the input range. The 1D-LUT data generation unit 105 may calculate the ratio of the display range to the input range based on the acquired input range information and display range information, and acquire the gain value G corresponding to the calculation result from the storage unit 104.

Figure 6:
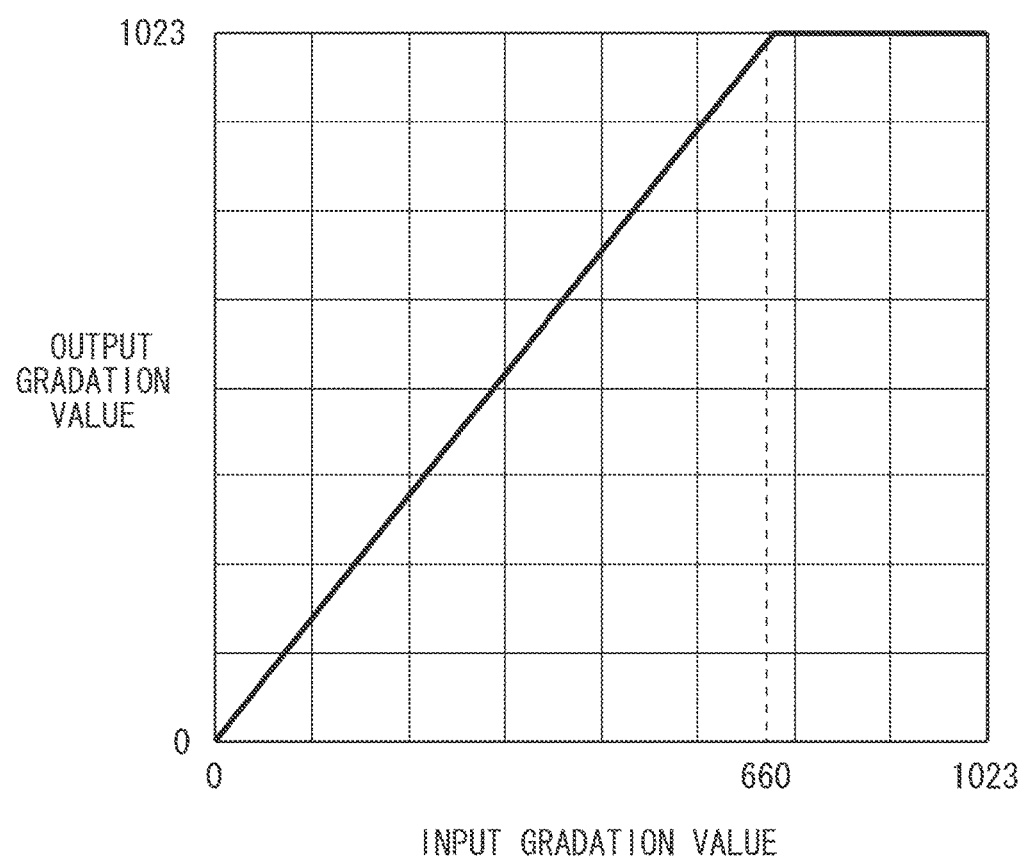
FIG. 6 is a diagram illustrating 1D-LUT data generated by using an equation (4).

FIG. 6 is a diagram illustrating the 1D-LUT data generated by the 1D-LUT data generation unit 105 with the equation (4). In FIG. 6, the horizontal axis and the vertical axis represent input gradation values and output gradation values, respectively. For example, the gain value G corresponding to a 0.04 ratio of the display range to the input range is 1.38, the display range 0 to 800% is represented by the gradation values 0 to 1023, and the gradation value 1023 also represents the range exceeding 800%. A larger gain value G is used for a smaller ratio of the display range to the input range, and a smaller gain value G (closer to 1) is used for a larger ratio of the display range to the input range. Also in this case, with a smaller ratio of the display range to the input range, the low gradation characteristics are improved (a larger number of output gradation values are allocated in a low gradation range of the input gradation values).

Figure 7:
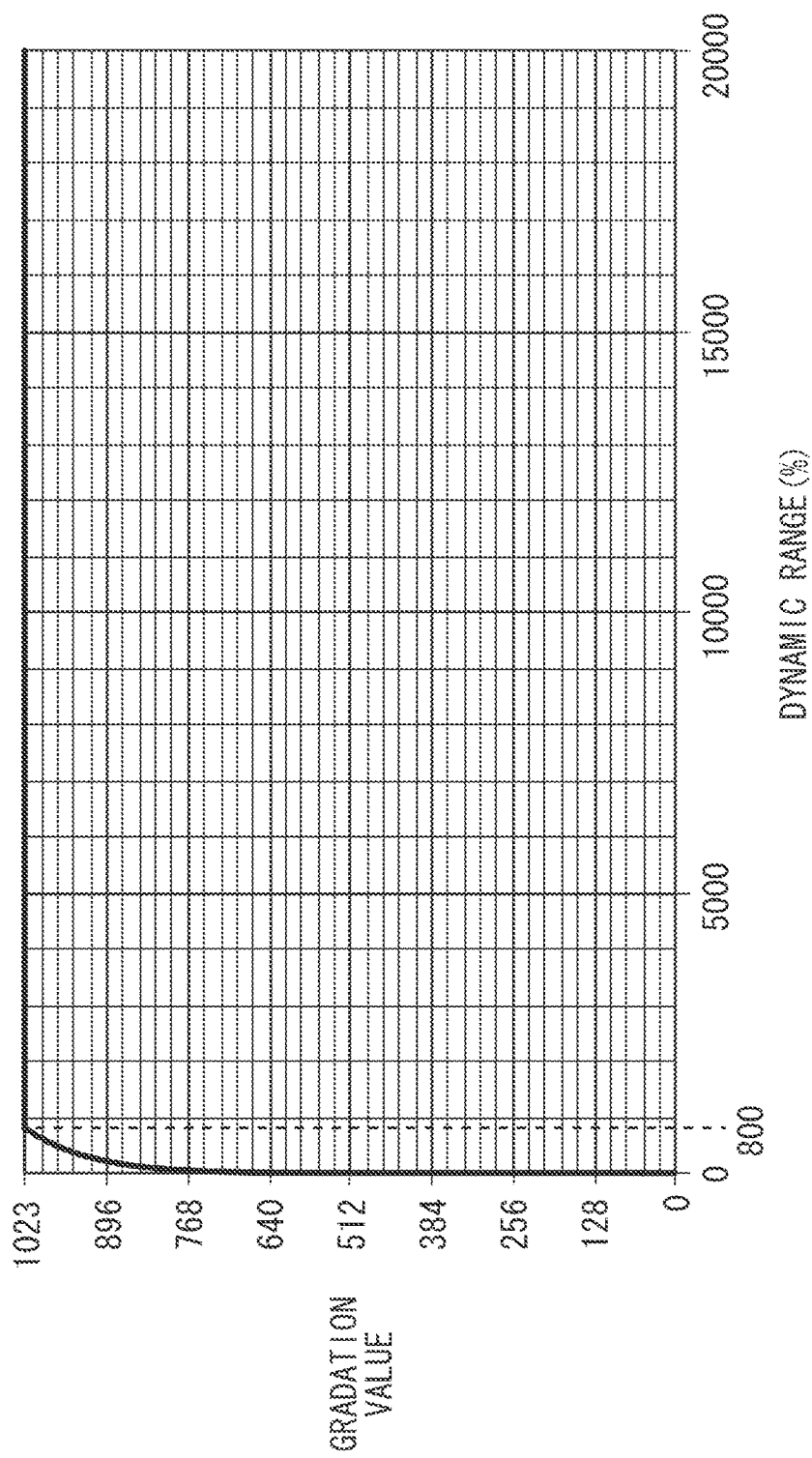
FIG. 7 is a diagram illustrating a corresponding relationship between gradation values of each of R, G, and B colors of image data obtained by 1D-LUT conversion processing using the 1D-LUT data illustrated in FIG. 6, and input and display ranges.

FIG. 7 is a diagram illustrating a corresponding relationship between the gradation values of each of the R, G, and B colors of the image data obtained by the 1D-LUT conversion processing using the 1D-LUT data illustrated in FIG. 6, and the input and display ranges. In FIG. 7, the horizontal axis and the vertical axis represent the dynamic range and the gradation values, respectively. FIG. 7 illustrates an example where the image data obtained by the 1D-LUT conversion processing has a 10-bit gradation (gradation values from 0 to 1023) of each of the R, G, and B colors, and the input range and the display range are 0 to 20000% and 0 to 800%, respectively. Compared with the state before the 1D-LUT conversion processing illustrated in FIG. 3, a larger number of gradations are allocated in the display range 0 to 800%.

The 1D-LUT data generation unit 105 may select one from the equations (2) to (4) based on the gradation characteristics information (information indicating the gradation characteristics set in the system control unit 103) acquired from the system control unit 103. For example, the equation (2) may be selected when the gradation characteristics information indicates the γ gradation characteristics, and the equation (3) may be selected when the gradation characteristics information indicates the log gradation characteristics.

The 3D-LUT data generation unit 106 acquires the input range information, the display range information, and the gradation characteristics information from the system control unit 103. The 3D-LUT data generation unit 106 further acquires, as the 3D-LUT generation data, an equation used for the 3D-LUT conversion processing, a coefficient used in the equation, and position information of the grid points in the 3D-LUT from the storage unit 104. The position information of the grid points of the 3D-LUT indicates the positions of the grid points to which the gradation values of the image data input to the 3D-LUT conversion processing unit 109 are respectively allocated.

Figure 8:
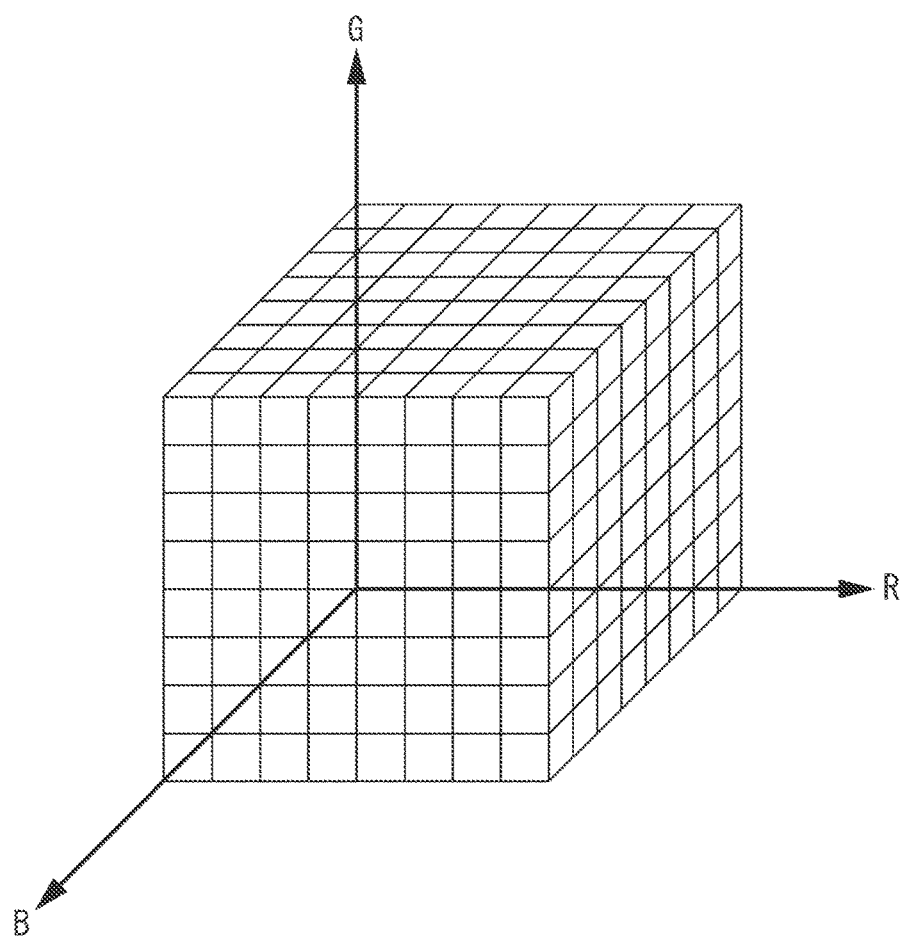
FIG. 8 is a schematic diagram illustrating a three-dimensional lookup table (3D-LUT) including equally-spaced grid points.

FIG. 8 is a schematic diagram illustrating a 3D-LUT including equally-spaced grid points. This 3D-LUT includes equally-spaced nine grid points on each axis, and thus includes a total of 729 (9×9×9) grid points on the three axes corresponding to R, G, and B, respectively. The 3D-LUT data generation unit 106 generates, for each grid point in the 3D-LUT, the conversion data (data including input gradation values and output gradation values) of each of the R, G, and B colors.

Figure 9:
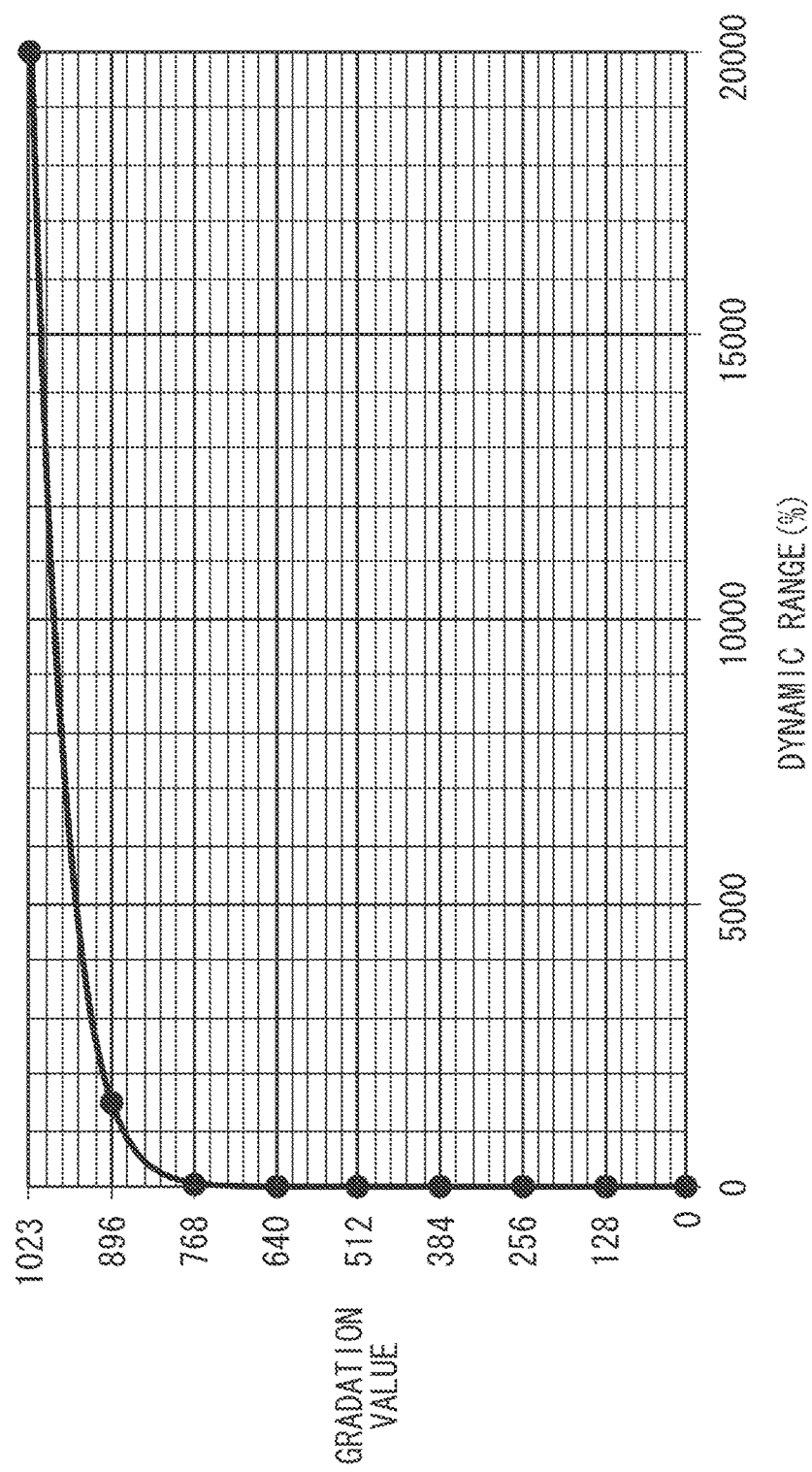
FIG. 9 is a diagram illustrating a corresponding relationship among gradation values of each of R, G, and B colors of image data before 3D-LUT conversion processing, an input range, and grid point positions, in a case where a 3D-LUT including equally-spaced grid points is used.

FIG. 9 is a diagram illustrating a corresponding relationship among the gradation values of each of the R, G, and B colors of the image data before the 3D-LUT conversion processing, the input range, and the grid point positions in a case where a 3D-LUT including equally-spaced grid points is used. In FIG. 9, the horizontal axis and the vertical axis represent the dynamic range and the gradation values, respectively. FIG. 9 illustrates an example where the image data (image data before the 3D-LUT conversion processing) obtained by the 1D-LUT conversion processing using the above-described equation (2) includes a 10-bit gradation (gradation values from 0 to 1023) of each of the R, G, and B colors, and the input range is 0 to 20000%. Here, a grid point is allocated to the minimum gradation value 0 corresponding to the minimum value 0% of the input range, and a grid point is allocated to the maximum gradation value 1023 corresponding to the maximum value 20000% of the input range. Between the two grid points, seven grid points are allocated at equal intervals. The eight grid points are allocated within the dynamic range 0 to 1500% of the image data. By using such a 3D-LUT including evenly-spaced grid points, when the display range is within 0 to 1500%, for example, eight out of the nine grid points corresponding to each of the R, G, and B colors can be effectively used.

Figure 10:
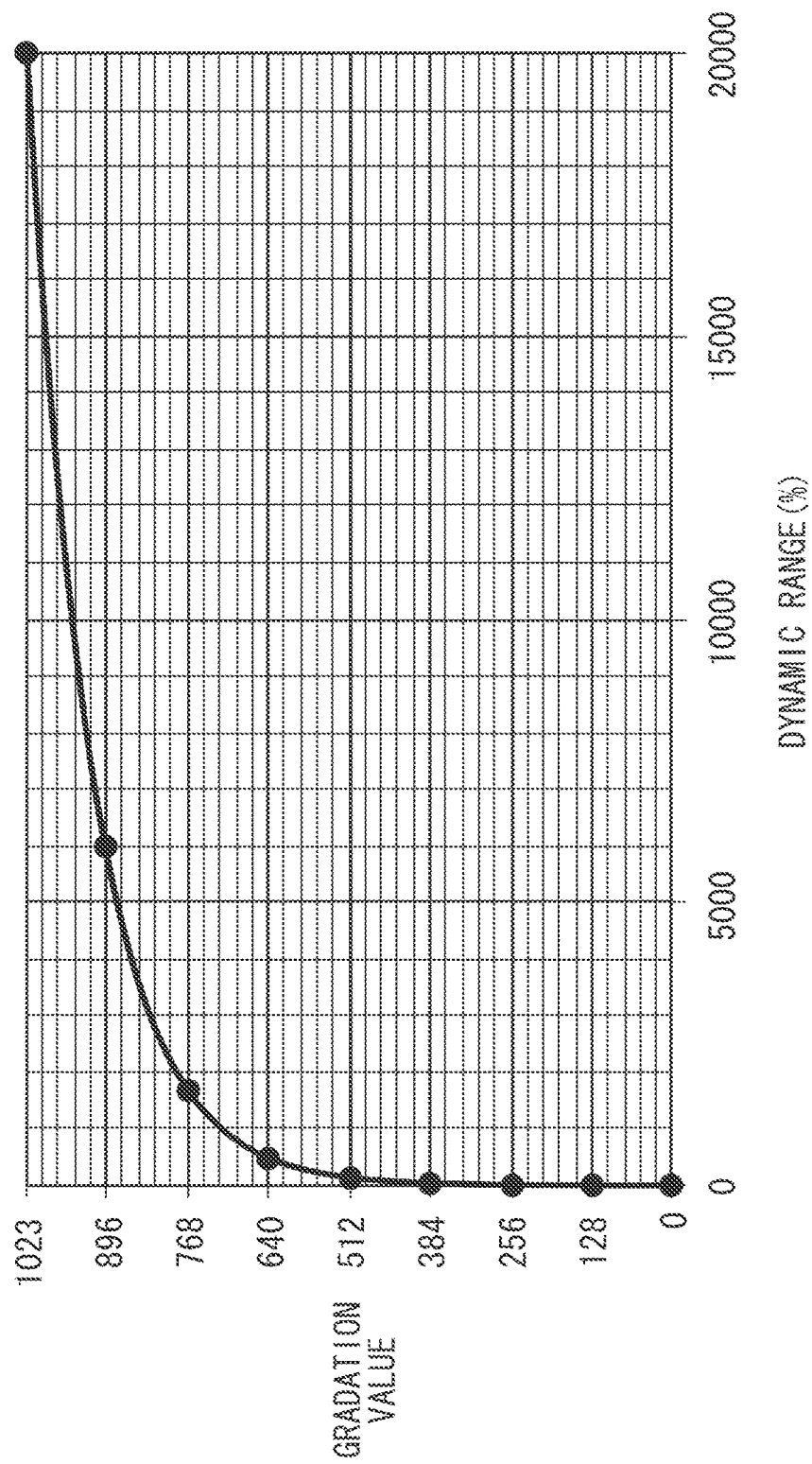
FIG. 10 is a diagram illustrating a comparative example of FIG. 9.

FIG. 10 is a diagram illustrating a comparative example of FIG. 9. FIG. 10 illustrates a corresponding relationship among the gradation values of each of the R, G, and B colors of the image data before the 3D-LUT conversion processing, the input range, and the grid point positions in a case where the 3D-LUT conversion processing is performed on the image data from the image input unit 102 without performing the 1D-LUT conversion processing. In this case, eight grid points are allocated in the dynamic range 0 to 6000% of the image data, and only six grid points are allocated in the dynamic range 0 to 1500% of the image data. Thus, for example, when the display range is 0 to 1500%, if the 3D-LUT conversion processing using a 3D-LUT including evenly-spaced grid points is performed without performing the 1D-LUT conversion processing, only six out of the nine grid points corresponding to each of the R, G, and B colors can be effectively used.

In the present exemplary embodiment, the 3D-LUT conversion processing is performed after the 1D-LUT conversion processing is appropriately performed on the image data from the image input unit 102, and thus a largest possible number of grid points can be allocated in the display range, whereby the grid points can be effectively used. The effective use of the largest possible number of grid points can reduce errors due to interpolation for calculating the output gradation values corresponding to the input gradation values of the image data between the grid points. All things considered, the conversion processing using a lookup table can be favorable performed.

Figure 11:
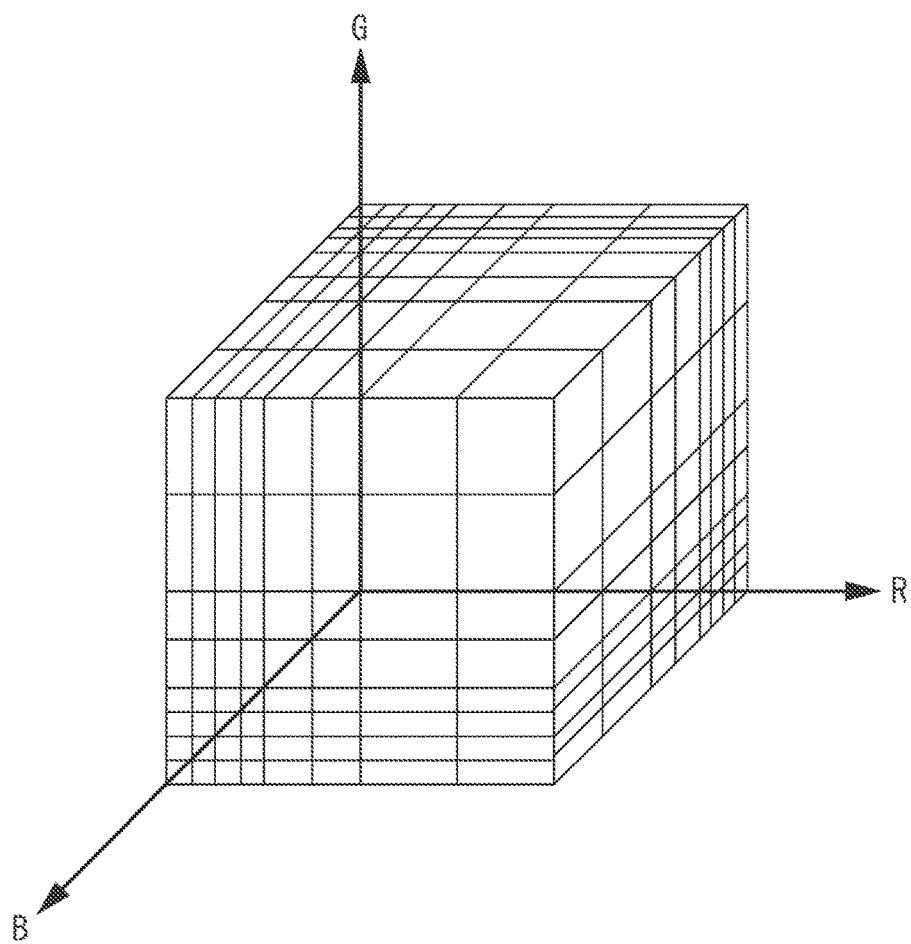
FIG. 11 is a schematic diagram illustrating a 3D-LUT including unequally-spaced grid points.

FIG. 11 is a schematic diagram illustrating a 3D-LUT including unequally-spaced grid points. This 3D-LUT includes nine unequally-spaced grid points on each axis, and thus includes a total of 729 (9×9×9) grid points on the three axes corresponding to R, G, and B, respectively. With smaller R, G, and B values, the grid points are spaced at smaller intervals. With larger R, G, and B values, the grid points are spaced at larger intervals. In this case, a grid point is allocated to the minimum gradation value 0 corresponding to the minimum value 0% of the input range, and a grid point is allocated to the maximum gradation value 1023 corresponding to the maximum value 20000% of the input range. Between the two grid points, seven grid points are allocated at unequal intervals. The 3D-LUT data generation unit 106 generates, for each of the grid points of the 3D-LUT, the conversion data (data including input gradation values and output gradation values) of each of the R, G, and B colors.

The 3D-LUT data generation unit 106 determines the positions of the grid points of the 3D-LUT based on the input range information and display range information acquired from the system control unit 103 so that the gradation and dynamic range characteristics in the 3D-LUT conversion processing performed by the 3D-LUT conversion processing unit 109 conforms to the gradation and dynamic range characteristics in the 1D-LUT conversion processing performed by the 1D-LUT conversion processing unit 108.

For example, the 3D-LUT data generation unit 106 determines to use a 3D-LUT including evenly-spaced grid points as illustrated in FIG. 8, when the ratio of the display range to the input range is larger than 0.04. The 3D-LUT data generation unit 106 determines to use a 3D-LUT including unequally-spaced grid points as illustrated in FIG. 11, when the ratio of the display range to the input range is equal to or smaller than 0.04. In this case, the storage unit 104 needs to store in advance a plurality of patterns of grid point position information corresponding to different ratios of the display range to the input range. When the input range is 0 to 20000% and the display range is 0 to 800%, the ratio of the display range to the input range is 0.04. When a 3D-LUT including unequally-spaced grid points as illustrated in FIG. 11 is used, eight grid points can be allocated within the dynamic range 0 to 800% of the image data. Thus, a larger number of grid points can be effectively used compared with a case where a 3D-LUT including equally-spaced grid points as illustrated in FIG. 8 is used. More specifically, only seven grid points are allocated within the display range 0 to 800% in the case of FIG. 8. The effective use of the largest possible number of grid points can reduce errors due to interpolation for calculating the output gradation values to the input gradation values of the image data between the grid points. All things considered, the conversion processing using an LUT can be favorably performed.

As described above, the interval between the grid points of a 3D-LUT may be determined according to the ratio of the display range to the input range. More specifically, with a smaller ratio of the display range to the input range, the grid points corresponding to R, G, and B values closer to 0 are spaced at smaller intervals so that a larger number of grid points are allocated within a low gradation range.

After determining the positions of the grid points of the 3D-LUT, the 3D-LUT data generation unit 106 acquires, as the 3D-LUT generation data, an equation used for the 3D-LUT conversion processing and a coefficient used in the equation from the storage unit 104, to generate the 3D-LUT data. The 3D-LUT data is conversion data (data including input gradation values and output gradation values) corresponding to 729 grid points for each of the R, G, and B colors.

The equation used for generating the 3D-LUT data is numerical representation of image processing, which includes converting a color space of the input image data into a color space for image processing with a 3×3 matrix, performing color correction processing in the color space for image processing with a 3×3 matrix, and then converting the values obtained by the color correction processing back to the original color space of the image data with a 3×3 matrix. The processing is represented by the following equation (5):

$$\begin{bmatrix} R' \\ G' \\ B' \end{bmatrix} = \begin{bmatrix} R_{11} & R_{12} & R_{13} \\ R_{21} & R_{22} & R_{23} \\ R_{31} & R_{32} & R_{33} \end{bmatrix} \cdot \begin{bmatrix} X_{11} & X_{12} & X_{13} \\ X_{21} & X_{22} & X_{23} \\ X_{31} & X_{32} & X_{33} \end{bmatrix} \cdot \begin{bmatrix} T_{11} & T_{12} & T_{13} \\ T_{21} & T_{22} & T_{23} \\ T_{31} & T_{32} & T_{33} \end{bmatrix} \cdot \begin{bmatrix} R \\ R \\ B \end{bmatrix} \quad (5)$$

In the equation (5), R, G, and B represent pixel values before the conversion, R', G', and B' represent pixel values after the conversion, $T_{11}$ to $T_{33}$ represent coefficients for converting the color space of the image data into the color space for image processing, $X_{11}$ to $X_{33}$ represent coefficients for the color correction processing in the color space for image processing, and $R_{11}$ to $R_{33}$ represent coefficients for converting the color space for image processing into the original color space of the image data.

The 3D-LUT data generation unit 106 calculates the R', G', and B' values with the equation (5), normalizes the calculated values so as to be represented by 10-bit gradation values to generate the 3D-LUT data, and outputs the generated 3D-LUT data to the 3D-LUT conversion processing unit 109 and the communication unit 111. The 3D-LUT data is the conversion data (data including input gradation values and output gradation values) of each of the R, G, and B colors corresponding to 729 grid points.

The 3D-LUT conversion processing unit 109 acquires the 3D-LUT data generated by the 3D-LUT data generation unit 106. The 3D-LUT conversion processing unit 109 then uses the conversion data (data including input gradation values and output gradation values) stored in the 729 grid points of the 3D-LUT to perform the 3D-LUT conversion processing on each pixel value of the image data output from the 1D-LUT conversion processing unit 108. In the 3D-LUT conversion processing, the output gradation values corresponding to the input gradation values of the image data between the grid points are calculated by interpolation. The 3D-LUT conversion processing unit 109 outputs the image data obtained by the 3D-LUT conversion processing to the display unit 110.

The display unit 110 is a display module including a liquid crystal panel and a backlight, for example and performs processing for displaying on the screen the image data obtained by the 3D-LUT conversion processing.

The communication unit 111 communicates with an external apparatus such as the editing apparatus 300, and inputs and outputs various pieces of information and data in a mutually interpretable format to and from the external apparatus. More specifically, when the communication unit 111 receives from the system control unit 103 an output instruction for outputting the various pieces of information and data to the editing apparatus 300. Then, the communication unit 111 outputs to the editing apparatus 300 the adjustment information, the input range information, the display range information, the 1D-LUT data, the 3D-LUT data, and the like. In this process, format conversion is performed as appropriate based on editing apparatus information including information indicating the format of the LUT data supported by the editing apparatus 300 and information indicating the image format supported by the editing apparatus 300. For example, when the LUT data and the range information to be output are in formats not supported by the editing apparatus 300, the communication unit 111 converts the LUT data and the range information into the formats supported by the editing apparatus 300 and then outputs them to the editing apparatus 300. If the editing apparatus 300 supports no LUT data or range information in the first place, the communication unit 111 performs no conversion, and outputs no LUT data or range information to the editing apparatus 300.

Figure 12A:
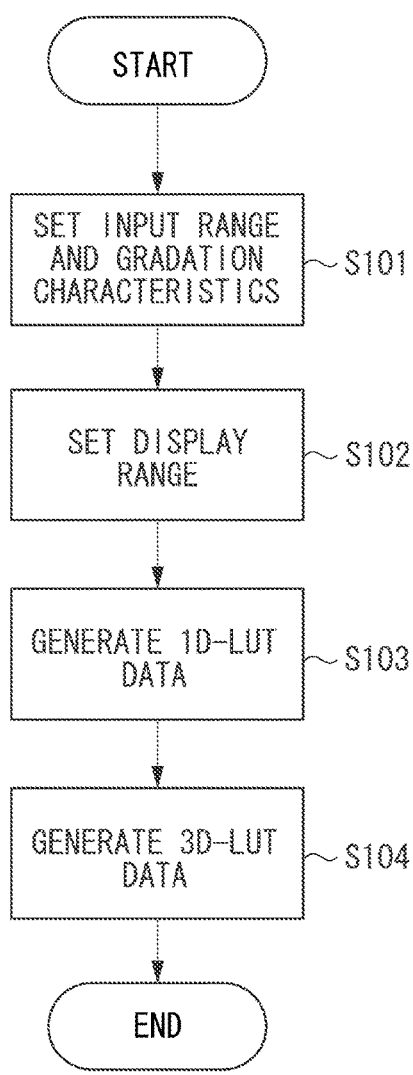
FIG. 12A is a flowchart illustrating a procedure of processing for generating 1D-LUT data and 3D-LUT data, performed by at least the display apparatus illustrated in FIG. 2.
Figure 12B:
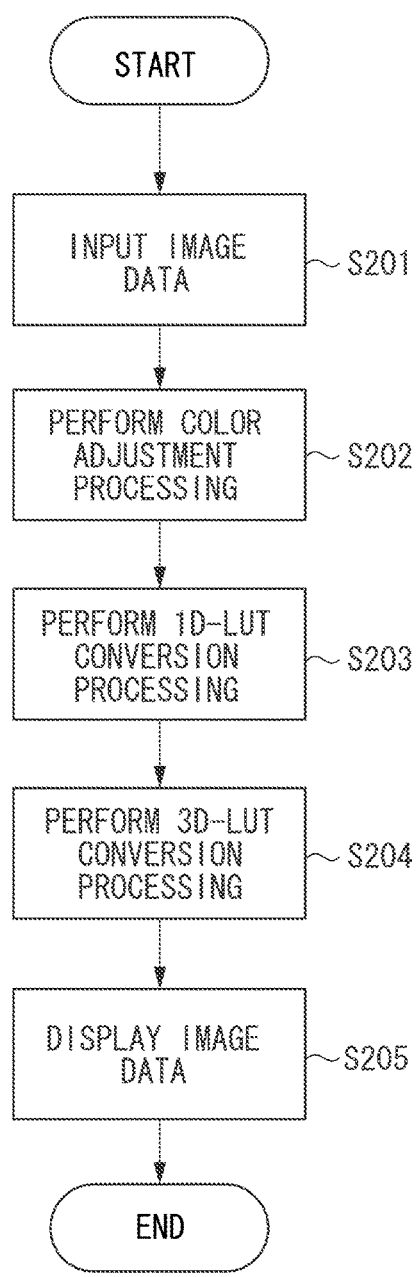
FIG. 12B is a flowchart illustrating a procedure of 1D-LUT conversion processing and 3D-LUT conversion processing performed by at least the display apparatus illustrated in FIG. 2.

FIGS. 12A and 12B are flowcharts illustrating the processing performed by the display apparatus 100 illustrated in FIG. 2. FIG. 12A is a flowchart illustrating a procedure of 1D-LUT data and 3D-LUT data generation processing performed by the display apparatus 100.

In step S101, the system control unit 103 sets the image format of the input image data according to the operation information acquired from the operation input unit 101, and further sets the input range corresponding to the set image format and the gradation characteristics related to the log characteristics. The system control unit 103 then outputs the gradation characteristics information and input range information related to the image data to the 1D-LUT data generation unit 105 and the 3D-LUT data generation unit 106.

In step S102, the system control unit 103 acquires the imaging apparatus information from the image input unit 102, and sets a display range, which is the display target of the display unit 110, based on the effective range information included in the imaging apparatus information. The system control unit 103 outputs the set display range information to the 1D-LUT data generation unit 105 and the 3D-LUT data generation unit 106.

In step S103, the 1D-LUT data generation unit 105 acquires the input range information, the display range information, and the gradation characteristics information from the system control unit 103. The 1D-LUT data generation unit 105 further acquires the 1D-LUT generation data from the storage unit 104. The 1D-LUT data generation unit 105 then generates the 1D-LUT data by using the acquired information and data, and outputs the generated 1D-LUT data to the 1D-LUT conversion processing unit 108.

In step S104, the 3D-LUT data generation unit 106 acquires the input range information, the display range information, and the gradation characteristics information from the system control unit 103. The 3D-LUT data generation unit 106 further acquires the 3D-LUT generation data from the storage unit 104. The 3D-LUT data generation unit 106 then generates the 3D-LUT data by using the acquired information and data, and outputs the generated 3D-LUT data to the 3D-LUT conversion processing unit 109.

FIG. 12B is a flowchart illustrating a procedure of the 1D-LUT conversion processing and the 3D-LUT conversion processing performed by the display apparatus 100.

In step S201, the image input unit 102 inputs the image data, which is transmitted from an external apparatus such as the imaging apparatus 200 through the SDI cable, into the display apparatus 100. The image input unit 102 performs the bit conversion processing, the format conversion processing, and the like on the input image data, and outputs the image data obtained by the conversion processing to the color adjustment unit 107.

In step S202, the color adjustment unit 107 performs the luminance/color adjustment processing on the image data from the image input unit 102 according to the adjustment information from the system control unit 103, and then outputs the adjusted image data to the 1D-LUT conversion processing unit 108 at the subsequent processing stage.

In step S203, the 1D-LUT conversion processing unit 108 acquires the 1D-LUT data generated by the 1D-LUT data generation unit 105. The 1D-LUT conversion processing unit 108 then performs the 1D-LUT conversion processing on each pixel value of the image data, which is output from the color adjustment unit 107, by using the conversion data (data including input gradation values and output gradation values) stored in the 1024 grid points of the 1D-LUT. The 1D-LUT conversion processing unit 108 outputs the image data obtained by the 1D-LUT conversion processing to the 3D-LUT conversion processing unit 109.

In step S204, the 3D-LUT conversion processing unit 109 acquires the 3D-LUT data generated by the 3D-LUT data generation unit 106. The 3D-LUT conversion processing unit 109 then performs the 3D-LUT conversion processing on each pixel value of the image data, which is output from the 1D-LUT conversion processing unit 108, by using the conversion data (data including input gradation values and output gradation values) stored in the 729 grid points of the 3D-LUT. The 3D-LUT conversion processing unit 109 outputs the image data obtained by the 3D-LUT conversion processing to the display unit 110.

In step S205, the display unit 110 performs processing for displaying on the screen the image data obtained by the 3D-LUT conversion processing.

The 1D-LUT data generation processing in step S103 may be performed at any timing as long as it is performed before the 1D-LUT conversion processing in step S203. The 3D-LUT data generation processing in step S104 may be performed at any timing as long as it is performed before the 3D-LUT conversion processing in step S204.

When the image data is moving image data, the 1D-LUT data and the 3D-LUT data that have been generated may be repeatedly used to perform the 1D-LUT conversion processing and the 3D-LUT conversion processing. In this case, the processing from S101 to S104 may be performed once and the processing from S201 to S205 may be repeatedly performed.

As described above, in the present exemplary embodiment, conversion processing using a LUT can be favorably performed on image data in an image format with a wide dynamic range. More specifically, the 1D-LUT conversion processing is appropriately performed according to a set display range and then the 3D-LUT conversion processing is performed. Thus, a largest possible number of grid points can be allocated in the display range and thus can be effectively used. The effective use of the largest possible number of grid points can reduce errors due to interpolation for calculating the output gradation values corresponding to the input gradation values of the image data between the grid points. All things considered, the conversion processing using an LUT can be favorably performed.

The exemplary embodiment of the present inventions is applicable to an image processing apparatus without the display unit 110 and the communication unit 111. The exemplary embodiment of the present inventions is also applicable to a data generation apparatus without the color adjustment unit 107, the 1D-LUT conversion processing unit 108, the 3D-LUT conversion processing unit 109, the display unit 110, and the communication unit 111.

While the exemplary embodiment of the present inventions has been described assuming that the image data is moving image data, the exemplary embodiment is also applicable to still image data.

The exemplary embodiment of the present inventions may be implemented by the following processing. Specifically, software (program) for implementing the functions of the exemplary embodiment described above is supplied to a system or an apparatus through a network or various storage media (a non-volatile memory such as a ROM or a RAM), and a computer (or a CPU, a microprocessor unit (MPU), or the like) reads out and executes the program. Thus, the computer program for implementing the functions of the exemplary embodiment described above is one exemplary embodiment of the present inventions.

While the present inventions have been described with reference to exemplary embodiments, it is to be understood that the inventions are not limited to the disclosed exemplary embodiments. The scope of the following claims is to be accorded the broadest interpretation so as to encompass all such modifications and equivalent structures and functions.

This application claims the benefit of Japanese Patent Application No. 2014-026676, filed Feb. 14, 2014, which is hereby incorporated by reference herein in its entirety.

What is claimed is:

1. A display apparatus comprising:
a display panel; and
at least one processor that operates to:
set a second dynamic range as a display target of the display panel in a first dynamic range of input image data;
generate a 1D-LUT as a one-dimensional lookup table for performing first conversion processing, by which a gradation characteristic in a gradation range corresponding to the second dynamic range is improved and gradation values higher than the gradation range corresponding to the second dynamic range are converted to the maximum gradation value, on each of red values, green values, and blue values of the input image data;
perform the first conversion processing on each of red values, green values, and blue values of the input image data by using the same 1D-LUT;
generate, based on the set second dynamic range, a 3D-LUT as a three-dimensional lookup table for performing second conversion processing on red values, green values, and blue values of image data obtained by the first conversion processing;
perform the second conversion processing, by using the 3D-LUT, on red values, green values, and blue values of the image data obtained by the first conversion processing; and
output, to the display panel, image data obtained by the second conversion processing,
wherein the 1D-LUT is generated such that the smaller a ratio of the set second dynamic range to the first dynamic range is, the more a low gradation characteristic of the input image data is improved by the 1D-LUT.

2. The display apparatus according to claim 1, wherein the smaller the ratio of the set second dynamic range to the first dynamic range is, the larger number of output gradation values are allocated in a low gradation range of the input gradation values by the 1D-LUT.

3. The display apparatus according to claim 1, wherein the at least one processor further operates to generate the 1D-LUT by using a gain value, which is applied to each of red values, green values, and blue values of the input image data, for a ratio of the set second dynamic range to the first dynamic range of the input image data, the gain value for the ratio of the set second dynamic range to the first dynamic range of the input image data being larger than another gain value for another ratio of a set second dynamic range to a first dynamic range that is larger than the ratio of the set second dynamic range to the first dynamic range of the input image data.

4. The display apparatus according to claim 1, wherein the at least one processor further operates to generate the 3D-LUT in which grid points are allocated to at least maximum and minimum values of the first dynamic range of the input image data.

5. The display apparatus according to claim 1, wherein the at least one processor further operates to set the second dynamic range according to a user operation.

6. The display apparatus according to claim 1, wherein the at least one processor further operates to acquire, from the input image data, information indicating a dynamic range corresponding to the second dynamic range, and to set the second dynamic range based on the acquired information.

7. The display apparatus according to claim 1, wherein the at least one processor further operates to set the second dynamic range based on a result of analyzing the input image data.

8. The display apparatus according to claim 1, wherein the at least one processor further operates to set the first dynamic range according to a user operation.

9. The display apparatus according to claim 1, the at least one processor further operates to obtain, from the input image data, information relating to the first dynamic range of the input image data.

10. The display apparatus according to claim 1, the number of grid points of the 3D-LUT is smaller than the number of grid points of the 1D-LUT.

11. A display apparatus comprising:
a display panel; and
at least one processor that operates to:
set a second dynamic range as a display target of the display panel in a first dynamic range of input image data;
generate a 1D-LUT as a one-dimensional lookup table for performing first conversion processing, by which a gradation characteristic in a gradation range corresponding to the second dynamic range is improved and gradation values higher than the gradation range corresponding to the second dynamic range are converted to the maximum gradation value, on each of red values, green values, and blue values of the input image data;
perform the first conversion processing on each of red values, green values, and blue values of the input image data by using the same 1D-LUT;
generate, based on the set second dynamic range, a 3D-LUT as a three-dimensional lookup table for performing second conversion processing on red values, green values, and blue values of image data obtained by the first conversion processing;

perform the second conversion processing, by using the 3D-LUT, on red values, green values, and blue values of the image data obtained by the first conversion processing; and output, to the display panel, image data obtained by the second conversion processing, wherein the smaller a ratio of the set second dynamic range to the first dynamic range is, the more grid points are allocated in a low gradation range in the 3D-LUT.

12. An image processing method implemented by a display apparatus having a display panel, the image processing method comprising:

setting a second dynamic range as a display target of the display panel in a first dynamic range of input image data;

generating a 1D-LUT as a one-dimensional lookup table for performing first conversion processing, by which a gradation characteristic in a gradation range corresponding to the second dynamic range is improved and gradation values higher than the gradation range corresponding to the second dynamic range are converted to the maximum gradation value, on each of red values, green values, and blue values of the input image data;

performing the first conversion processing on each of red values, green values, and blue values of the input image data by using the same 1D-LUT;

generating, based on the set second dynamic range, a 3D-LUT as a three-dimensional lookup table for performing second conversion processing on red values, green values, and blue values of image data obtained by the first conversion processing;

performing the second conversion processing, by using the 3D-LUT, on red values, green values, and blue values of the image data obtained by the first conversion processing; and outputting, to the display panel, image data obtained by the second conversion processing, wherein the 1D-LUT is generated such that the smaller a ratio of the set second dynamic range to the first dynamic range is, the more a low gradation characteristic of the input image data is improved by the 1D-LUT.

13. A display apparatus comprising:

a display panel; and at least one processor operating to:

set a second dynamic range as a display target of the display panel in a first dynamic range of input image data;

perform first conversion processing on each of red values, green values, and blue values of the input image data by using a 1D-LUT as a one-dimensional lookup table for performing the first conversion processing, by which a gradation characteristic in a gradation range corresponding to the second dynamic range is improved and gradation values higher than the gradation range corresponding to the second dynamic range are converted to the maximum gradation value, on each of red values, green values, and blue values of the input image data;

perform second conversion processing, based on the set second dynamic range, by using a 3D-LUT as a three-dimensional lookup table for performing second conversion processing on red values, green values, and blue values of image data obtained by the first conversion processing; and output, to the display panel, image data obtained by the second conversion processing, wherein the smaller a ratio of the set second dynamic range to the first dynamic range is, the more a low gradation characteristic of the input image data is improved by the 1D-LUT.

14. The display apparatus according to claim 13, wherein the at least one processor sets the second dynamic range according to a user operation.

15. The display apparatus according to claim 13, wherein the at least one processor acquires, from the input image data, information indicating a dynamic range corresponding to the second dynamic range, and to set the second dynamic range based on the acquired information.

16. The display apparatus according to claim 13, wherein the at least one processor sets the second dynamic range based on a result of analyzing the input image data.

17. The display apparatus according to claim 13, wherein the at least one processor sets the first dynamic range according to a user operation.

18. The display apparatus according to claim 13, the at least one processor further operates to obtain, from the input image data, information relating to the first dynamic range of the input image data.

19. The display apparatus according to claim 13, the number of grid points of the 3D-LUT is smaller than the number of grid points of the 1D-LUT.

20. The display apparatus according to claim 13, wherein the smaller the ratio of the set second dynamic range to the first dynamic range is, the larger number of output gradation values are allocated in a low gradation range of the input gradation values by the 1D-LUT.

21. An image processing method implemented by a display apparatus having a display panel, the image processing method comprising:

setting a second dynamic range as a display target of the display panel in a first dynamic range of input image data;

performing first conversion processing on each of red values, green values, and blue values of the input image data by using a 1D-LUT as a one-dimensional lookup table for performing the first conversion processing, by which a gradation characteristic in a gradation range corresponding to the second dynamic range is improved and gradation values higher than the gradation range corresponding to the second dynamic range are converted to the maximum gradation value, on each of red values, green values, and blue values of the input image data;

performing second conversion processing, based on the set second dynamic range, by using a 3D-LUT as a three-dimensional lookup table for performing second conversion processing on red values, green values, and blue values of image data obtained by the first conversion processing; and outputting, to the display panel, image data obtained by the second conversion processing, wherein the smaller a ratio of the set second dynamic range to the first dynamic range is, the more a low gradation characteristic of the input image data is improved by the 1D-LUT.

* * * * *